(12) United States Patent
Wang et al.

(10) Patent No.: US 11,580,967 B2
(45) Date of Patent: Feb. 14, 2023

(54) SPEECH FEATURE EXTRACTION APPARATUS, SPEECH FEATURE EXTRACTION METHOD, AND COMPUTER-READABLE STORAGE MEDIUM

(71) Applicant: NEC Corporation, Tokyo (JP)

(72) Inventors: Qiongqiong Wang, Tokyo (JP); Koji Okabe, Tokyo (JP); Kong Aik Lee, Tokyo (JP); Takafumi Koshinaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 72 days.

(21) Appl. No.: 17/253,434

(22) PCT Filed: Jun. 29, 2018

(86) PCT No.: PCT/JP2018/024933
§ 371 (c)(1),
(2) Date: Dec. 17, 2020

(87) PCT Pub. No.: WO2020/003534
PCT Pub. Date: Jan. 2, 2020

(65) Prior Publication Data
US 2021/0256970 A1 Aug. 19, 2021

(51) Int. Cl.
*G10L 15/20* (2006.01)
*G10L 15/02* (2006.01)
(Continued)

(52) U.S. Cl.
CPC .............. *G10L 15/20* (2013.01); *G10L 15/02* (2013.01); *G10L 25/30* (2013.01); *G10L 25/84* (2013.01)

(58) Field of Classification Search
CPC ......... G10L 15/20; G10L 15/02; G10L 25/30; G10L 25/84
(Continued)

(56) References Cited

U.S. PATENT DOCUMENTS

2009/0138260 A1* 5/2009 Terao ...................... G10L 25/78
704/E15.005
2018/0068653 A1* 3/2018 Trawick .................. G10L 15/16
(Continued)

FOREIGN PATENT DOCUMENTS

JP 2006-078654 A 3/2006
WO 2018/163279 A1 9/2018

OTHER PUBLICATIONS

J. Lee, Y. Jung, M. Jung and H. Kim, "Dynamic Noise Embedding: Noise Aware Training and Adaptation for Speech Enhancement," 2020 Asia-Pacific Signal and Information Processing Association Annual Summit and Conference (APSIPA ASC), 2020, pp. 739-746. (Year: 2020).*

(Continued)

*Primary Examiner* — Bharatkumar S Shah

(57) ABSTRACT

A speech feature extraction apparatus 100 includes a voice activity detection unit 103 that drops non-voice frames from frames corresponding to an input speech utterance, and calculates a posterior of being voiced for each frame, a voice activity detection process unit 106 calculates a function value as weights in pooling frames to produce an utterance-level feature, from a given a voice activity detection posterior, and an utterance-level feature extraction unit 112 that extracts an utterance-level feature, from the frame on a basis of multiple frame-level features, using the function values.

10 Claims, 18 Drawing Sheets

(51) Int. Cl.
*G10L 25/30* (2013.01)
*G10L 25/84* (2013.01)

(58) Field of Classification Search
USPC .......................................................... 704/232
See application file for complete search history.

(56) References Cited

U.S. PATENT DOCUMENTS

2018/0330718 A1* 11/2018 Hori ..................... G06N 7/005
2019/0189115 A1* 6/2019 Hori ..................... G10L 15/183

OTHER PUBLICATIONS

International Search Report for PCT Application No. PCT/JP2018/024933, dated Sep. 11, 2018.

English translation of Written opinion for PCT Application No. PCT/JP2018/024933, dated Sep. 11, 2018.

N. Dehak, P. Kenny, R. Dehak, P. Dumouchel, and P. Ouellet, "Front-end factor analysis for speaker verification," IEEE Transactions on Audio, Speech, and Language Processing, vol. 19, pp. 788-798,2011, USA.

David Snyder, Daniel Garcia-Romero, Daniel Povey, and Sanjeev Khudanpur "Deep Neural Network Embeddings for Text-Independent Speaker Verification", in Proceedings of Interspeech, 2017, ISCA, Aug. 2017, pp. 999-1003, USA.

Yamamoto, Hitoshi et al., Robust i-vector extraction tightly coupled with voice activity detection using deep neural networks, Proc. APSIPA ASC2017, IEEE, Dec. 2017, pp. 600-604, USA.

Okabe Koji et al., Attentive Statistics Pooling for Deep Speaker Embedding, arXiv preprint,arXiv:1803.10963, [online],Mar. 29, 2018,<url:https://arxiv.org/pdf/1803.10963.pdf>, USA.

Japanese Office Action for JP Application No. 2020-568354 dated Nov. 24, 2021 with English Translation.

* cited by examiner

SPEECH FEATURE EXTRACTION APPARATUS, SPEECH FEATURE EXTRACTION METHOD, AND COMPUTER-READABLE STORAGE MEDIUM

This application is a National Stage Entry of PCT/JP2018/024933 filed on Jun. 29, 2018, the contents of all of which are incorporated herein by reference, in their entirety.

TECHNICAL FIELD

The present invention relates to a speech feature extraction apparatus, speech feature extraction method, and a computer-readable storage medium storing a program for realizing these.

BACKGROUND ART

In speaker recognition, the system input is a sequence of raw features (acoustic features) of variable number of frames. They are frame-level, while the system output expected to be speaker ID in speaker identification or target/non-target (same speaker/different speakers) in speaker verification.

Both of the output speaker ID and target/non-target are in the utterance level. To produce such utterance-level output from the frame-level input, a pooling (sum-up) process over all valid frames is necessary in somewhere in the speaker recognition system. Equally weighted pooling is commonly used for such a purpose.

For example, Non-Patent Documents (NPL) 1 and 2 disclose a speaker recognition system. FIG. 18 is a block diagram of the speaker recognition system disclosed in NPL 2.

CITATION LIST

Non Patent Literature

[NPL1] N. Dehak, P. Kenny, R. Dehak, P. Dumouchel, and P. Ouellet, "Front-end factor analysis for speaker verification," IEEE Transactions on Audio, Speech, and Language Processing, vol. 19, pp. 788-798, 2011

[NPL2] David Snyder, Daniel Garcia-Romero, Daniel Povey, and Sanjeev Khudanpur "Deep Neural Network Embeddings for Text-Independent Speaker Verification", in Proceedings of Interspeech, 2017

SUMMARY OF INVENTION

Technical Problem

In speaker recognition, no matter the standard ivector-based methods disclosed in the NPL1, or recently popular DNN-based speaker embedding methods disclosed in the NPL2, equally weighted pooling is used for such purpose of obtaining an output of utterance-level speaker recognition results from frame-level acoustic feature information.

In ivector-based methods of the NPL1, given an utterance with a L frame feature sequence $\{y_1, y_2, \ldots, y_L\}$, an utterance-level feature x is extracted in accord with Math. 1 and 2. In the Math. 1, M means supervector M. Supervector M is generated by concatenating all the $M_c$. In the Math. 2, c is the index of Gaussian components in GMM-UBM. All frames are treated equally, just in the manner of summation over all frames.

$$M = \mu + Tx, \qquad \text{[Math. 1]}$$

$$M_c = \frac{\sum_{t=1}^{L} P(c \mid y_t, \lambda) y_t}{\sum_{t=1}^{L} P(c \mid y_t, \lambda)}. \qquad \text{[Math. 2]}$$

All frames: $\sum_{t=1}^{L}$

In DNN-based methods as shown in [NPL2], an average pooling layer gives the same importance to every frame while in reality some frames do have more speaker information than others. This results in that the embeddings are not the accurate representation of speakers, so that speaker recognition performance is degraded no matter what model is used in backend.

An object of the present invention is to resolve the foregoing problem and provide a speech feature extraction apparatus, speech feature extraction method, and a computer-readable recording medium that can provide a more accurate representation of an utterance for speaker recognition task.

Solution to Problem

In order to achieve the foregoing object, a speech feature extraction apparatus according to one aspect of the present invention includes:

a voice activity detection unit that drops non-voice frames from frames corresponding to an input speech utterance, and calculates a posterior of being voiced for each frame;

a voice activity detection process unit that calculates a function value as weights in pooling frames to produce an utterance-level feature, from a given a voice activity detection posterior;

an utterance-level feature extraction unit that extracts an utterance-level feature, from the frame on a basis of multiple frame-level features, using the function values.

In order to achieve the foregoing object, a speech feature extraction method according to another aspect of the present invention includes:

(a) a step of dropping non-voice frames from frames corresponding to an input speech utterance, and calculates a posterior of being voiced for each frame;

(b) a step of calculating a function value as weights in pooling frames to produce an utterance-level feature, from a given a voice activity detection posterior;

(c) a step of extracting an utterance-level feature, from the frame on a basis of multiple frame-level features, using the function values.

In order to achieve the foregoing object, a computer-readable recording medium according to still another aspect of the present invention has recorded therein a program, and the program includes an instruction to cause the computer to execute:

(a) a step of dropping non-voice frames from frames corresponding to an input speech utterance, and calculates a posterior of being voiced for each frame;

(b) a step of calculating a function value as weights in pooling frames to produce an utterance-level feature, from a given a voice activity detection posterior;

(c) a step of extracting an utterance-level feature, from the frame on a basis of multiple frame-level features, using the function values.

Advantageous Effects of Invention

As described above, according to the present invention, it is possible to provide a more accurate representation of an utterance for speaker recognition task.

BRIEF DESCRIPTION OF DRAWINGS

The drawings together with the detailed description, serve to explain the principles for the inventive adaptation method. The drawings are for illustration and do not limit the application of the technique.

DESCRIPTION OF EMBODIMENTS

Principle of the Invention

This invention is to give weights using functions of Voice Activity Detection (VAD) posteriors for frames in pooling features from frame-level to utterance-level. It is a common sense that frames with higher VAD posteriors have more speaker information than those with low VAD posteriors which are likely to be silence or noise. So giving more weightage to those frames which have higher VAD posteriors will get a final representation for the utterance more appropriate for speaker recognition task.

EMBODIMENT

Each exemplary embodiment of the present invention will be described below with reference to the figures. The following detailed descriptions are merely exemplary in nature and are not intended to limit the invention or the application and uses of the invention. Furthermore, there is no intention to be bound by any theory presented in the preceding background of the invention or the following detailed description.

First Embodiment

A speech feature extraction apparatus of a first embodiment can utilize the posteriors of the VAD which is already applied in frame selections in most speech processing systems including speaker recognition, to give more weight to more voice-like frames. It can extract more appropriate utterance-level feature with existing VAD.

Hereinafter, a speech feature extraction apparatus, a speech feature method, and a program of the first embodiment of the present invention will be described with reference to FIGS. 1 to 7.

Device Configuration

Figure 1:
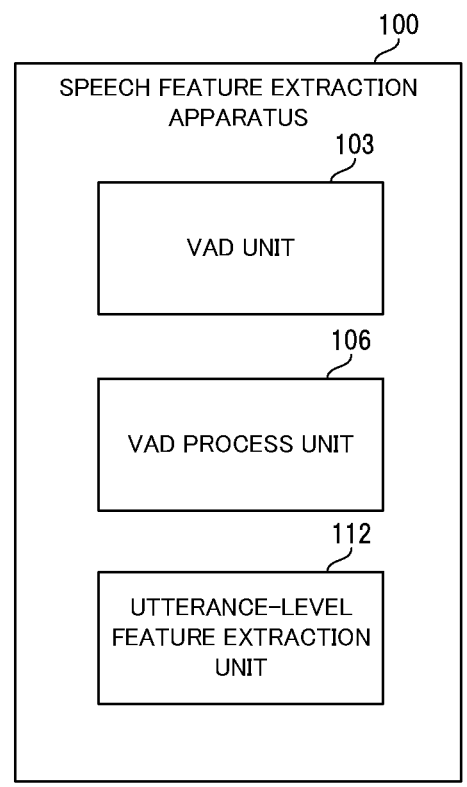
FIG. 1 is a block diagram schematically showing the configuration of the speech feature extraction apparatus according to the first embodiment of the present invention.

First, a schematic configuration of a speech feature extraction apparatus 100 according to the first embodiment will be described using FIG. 1. FIG. 1 is a block diagram schematically showing the configuration of the speech feature extraction apparatus according to the first embodiment of the present invention.

As shown in FIG. 1, the speech feature extraction apparatus 100 includes a voice activity detection (VAD) unit 103, a voice activity detection (VAD) process unit 106, and a utterance-level feature extraction unit 112.

The VAD unit 103 drops non-voice frames from frames corresponding to an input speech utterance, and calculates a posterior of being voiced for each frame. The VAD process unit 106 calculates a function value as weights in pooling frames to produce an utterance-level feature, from a given a voice activity detection posterior. The utterance-level feature extraction unit 112 extracts an utterance-level feature, from the frame on a basis of multiple frame-level features, using the function values.

According to the speech feature extraction apparatus 100, it is possible to provide a more accurate representation of an utterance for speaker recognition task.

Figure 2:
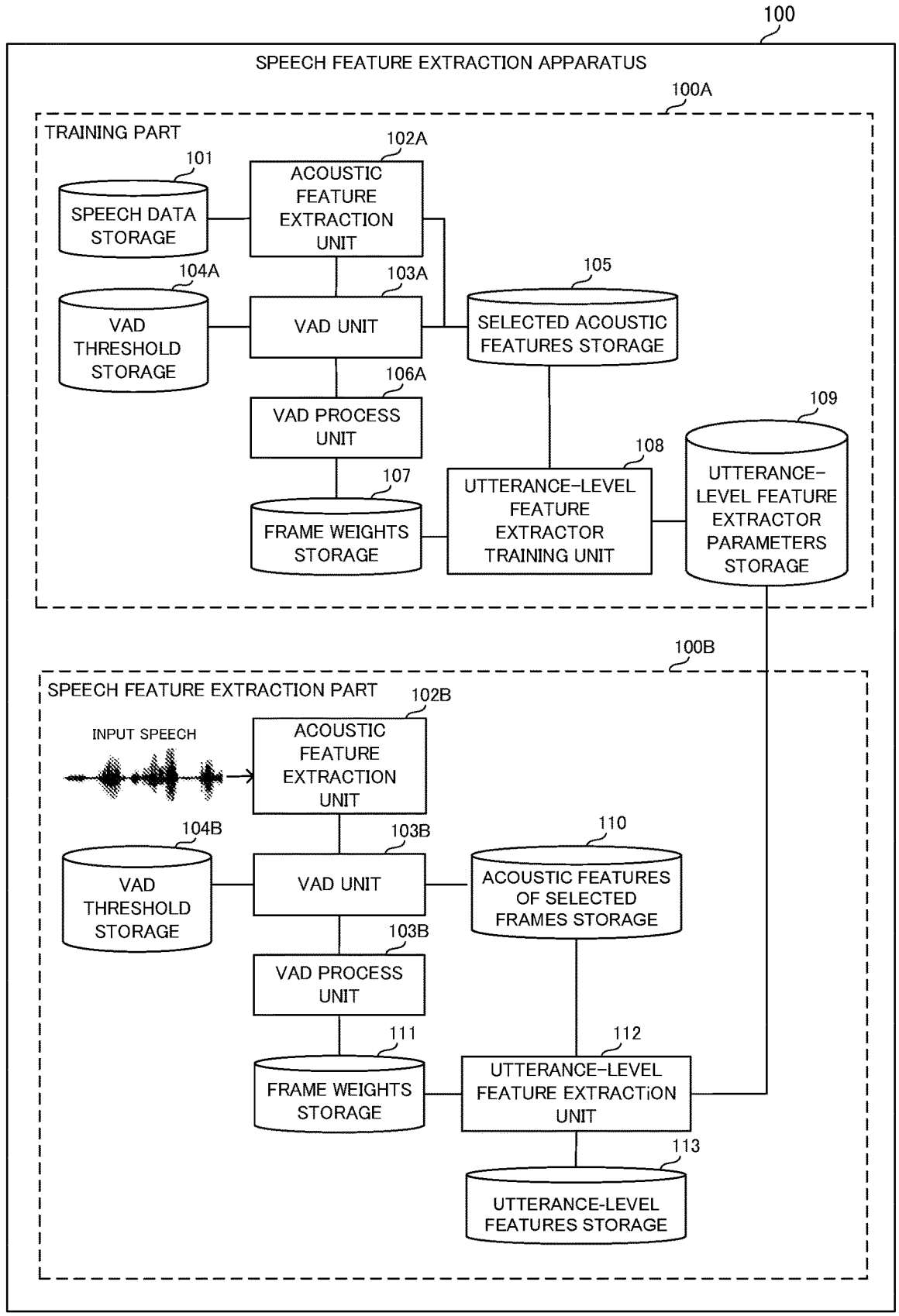
FIG. 2 is a block diagram showing the specific configuration of the speech feature extraction apparatus according to the first embodiment of the present invention.
Figure 3:
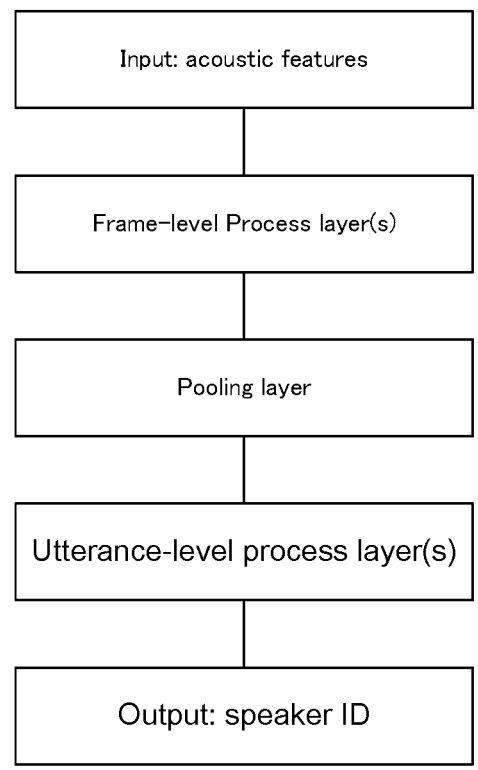
FIG. 3 shows an example of NN structure for NN-based speaker embedding structure.
Figure 4:
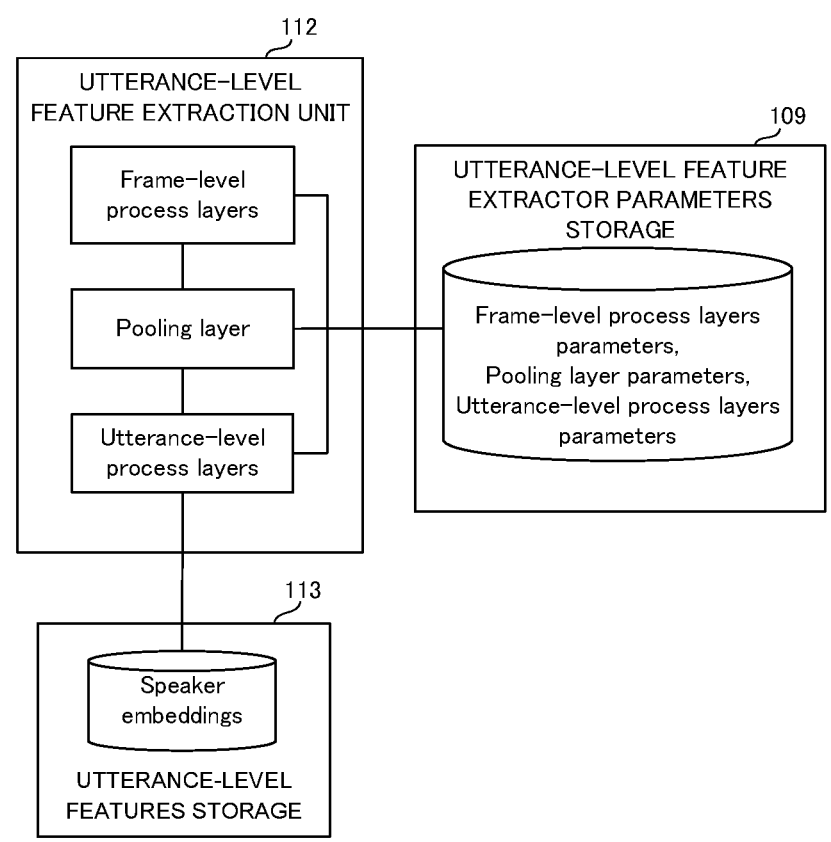
FIG. 4 shows an example of contents of utterance-level feature extraction unit, utterance-level feature extractor parameters storage, and utterance-level features storage of the first exemplary embodiment in the case of NN-based speaker embedding extraction.

Next, the configuration of the speech feature extraction apparatus of the first embodiment will be described in detail with reference to FIGS. 2 to 4 as well. FIG. 2 is a block diagram showing the specific configuration of the speech feature extraction apparatus according to the first embodiment of the present invention.

In the first embodiment of the present invention, the speech feature extraction apparatus 100 using existing VAD will be described. The speech feature extraction apparatus 100 includes a training part 100A and an utterance-level feature extraction part 100B. But the training part 100A and the utterance-level feature extraction part 100B are not necessarily to be tied together. The utterance-level feature extraction part 100B can be used alone with the training part in the prior arts disclosed in the NPL1 and the NPL2.

As shown in FIG. 2, the training part 100A includes a speech data storage 101, an acoustic feature extraction unit 102A, a VAD unit 103A, a VAD threshold storage 104A, a selected acoustic features storage 105, a VAD process unit 106A, a frame weights storage 107, a utterance-level feature extractor training unit 108 and an utterance-level feature extractor parameter storage 109.

The speech feature extraction part 100B includes an acoustic feature extraction unit 102B, a VAD unit 103B, a VAD threshold storage 104B, an acoustic features of selected frames storage 110, a VAD posterior unit 106B, a frame weights storage 111, an utterance-level feature extraction unit 112 and an utterance-level features storage 113.

The acoustic feature extraction unit 102A and the acoustic feature extraction unit 102B have the same function. The VAD unit 103A and the VAD unit 103B have the same function. The VAD unit 103A and the VAD unit 103B function as the above described the VAD unit 103 in FIG. 1. The VAD process unit 106A and the VAD process unit 106B have the same function. The VAD process unit 106A and the VAD process unit 106B function as the above described the VAD process unit 106.

The VAD threshold storage 104A and the VAD threshold storage 104B may be configured with the same storage, meaning that the same threshold is used in the training part and speech feature extraction part. Note that in case of VAD threshold storage, it is also possible to have different components in the training part 100A and utterance-level feature extraction part 100B.

The acoustic feature extraction unit 102 extracts acoustic feature vectors f from data in speech data storage 101. VAD unit 103A applies VAD to the acoustic features and obtains a VAD posterior P for each frame.

The VAD unit 103A compares VAD posteriors with a pre-determined VAD threshold THETA stored in VAD threshold storage 104A, and drops those frames whose VAD posteriors are smaller than the threshold (P<THETA), then stores the acoustic features of the remaining frames $\{f_i | P_i \geq THETA\}$ in selected acoustic feature storage 105.

The VAD process unit 106A passes the VAD posteriors P to a function and obtains weights for those frames w=F(P), then VAD process unit 106A stores them in frame weights storage 107.

The utterance-level feature extractor training unit 108 reads the acoustic features of the selected frames from the selected acoustic feature storage 105, and corresponding weights from the frame weights storage 107, trains an utterance-level feature extractor, and finally stores the extractor in the utterance-level feature extractor parameters storage 109.

In the speech feature extraction part, the acoustic feature extraction unit 102B extracts acoustic feature vectors from the input speech data. The VAD unit 103B applies VAD to the acoustic feature vectors and obtains a VAD posterior for each frame. The VAD unit 103B compares the VAD posteriors with a pre-determined VAD threshold stored in the VAD threshold storage 104B, and drops those frames whose VAD posteriors are smaller than the threshold.

The acoustic features of the remaining frames are stored in selected acoustic feature storage 110. The VAD process unit 106B passes the VAD posteriors to the function F(P) and obtains weights and stores them in the frame weights storage 111.

The utterance-level feature extraction unit 112 reads the acoustic features of the selected frames from the selected acoustic feature storage 110 and the corresponding weights from the frame weights storage 111, and extractor parameters from the utterance-level feature extractor parameter storage 109. It extracts one feature vector for the input utterance, and stores it in the utterance-level feature storage 113.

In one example of NN (Neural Network)-based speaker embedding, the NN at least has one input layer, one output layer and multiple hidden layers. As shown in the NN structure figure (FIG. 3), the hidden layers include at frame-level process layers, a pooling layer and utterance-level process layers. To train such an NN-based speaker embedding extractor, utterance-level feature extractor training unit 108 passes the acoustic features from storage 105 and corresponding frame weights from storage 107 to the input layer.

The training unit 108 also passes the speaker IDs to the output layer of the NN. Then it trains the NN and obtains the parameters of hidden layers and stores them in the storage 109 (FIG. 4). So, in the NN-based speaker embedding case, besides the acoustic feature of the selected frames are stored in storage 105, speaker ID is also carried together with the acoustic features from speech data storage 101.

The utterance-level feature extractor parameter storage 109 stores NN parameters (FIG. 4), which at least includes frame-level process layers parameters, pooling layer parameters and utterance-level process layers parameters. In the speech feature extraction part 100B, input layer is the acoustic features stored in storage 110 and frame weights from storage 111, and the output layer is removed. Hidden layers are from the storage 109. The NN passes the inputs forward and one of the output of the utterance-level process layers is used as the speaker embedding-utterance-level feature.

Figure 5:
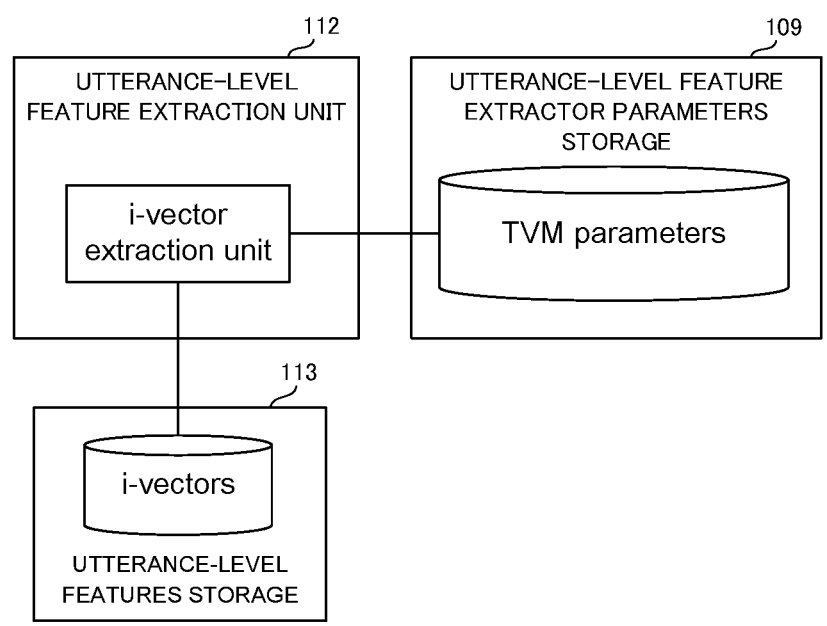
FIG. 5 shows an example of contents of utterance-level feature extraction unit, utterance-level feature extractor parameters storage, and utterance-level features storage of the first exemplary embodiment in the case of i-vector extraction.

In the example of i-vector, speaker IDs are not necessary in the utterance-level feature extractor training unit 108. The utterance-level feature extractor training unit 108 trains a total variability matrix (T matrix) and stores it in the utterance-level feature extractor parameter storage 109 (FIG. 5). In the utterance-level feature extraction part, utterance-level feature extraction unit 112 extracts i-vectors from the acoustic features in storage 110, using the T-matrix stored in storage 109, given the frame weights from storage 111.

The function in VAD process unit 106A and 106B is monotonically increasing by the VAD posteriors, to make sure that more likely the frames is to be voice, more weights is given to it in pooling. In addition, it should also satisfy Math. 3 over all frames selected for one utterance. The function has a wide range of choices. The simplest example is Math. 4, where the weight of a frame is linear to the its VAD posterior.

$$\sum_i F(P_i) = 1 \qquad \text{[Math. 3]}$$

$$F(P_i) = \frac{P_i}{\sum_j F(P_i)} \qquad \text{[Math. 4]}$$

We can also choose function that contains parameters, for example, the Math. 5. Larger ALPHA means that more trust is given to the VAD. We have many other choices like Odds, log Odds, and so on.

$$F(P_i) = \frac{P_i^\alpha}{\sum_j F(P_j^\alpha)}. \qquad \text{[Math. 5]}$$

Operations of Apparatus

Next, operations performed by the speech feature extraction apparatus 100 according to the first embodiment of the present invention will be described with reference to FIGS. 6 to 8. FIGS. 1 to 5 will be referenced as necessary in the following description. Also, in the first embodiment, a speech feature extraction method is implemented by causing the speech feature extraction apparatus to operate. Accordingly, the following description of operations performed by the speech feature extraction apparatus 100 will substitute for a description of the speech feature extraction method of the first embodiment.

The whole operation of speech feature extraction apparatus 100 will be described by referring to FIG. 6. FIG. 6 is a flowchart showing operations performed by the speech feature extraction apparatus according to the first embodiment of the present invention. FIG. 6 contains operations of the training part 100A and the speech feature extraction part 100B. However, this shows an example, the operation of the training and feature extraction can be executed continuously or time interval can be inserted, or the operation of feature re extraction can be executed with other training operation, for example, prior arts disclosed in the NPL1 and NPL2.

Figure 6:
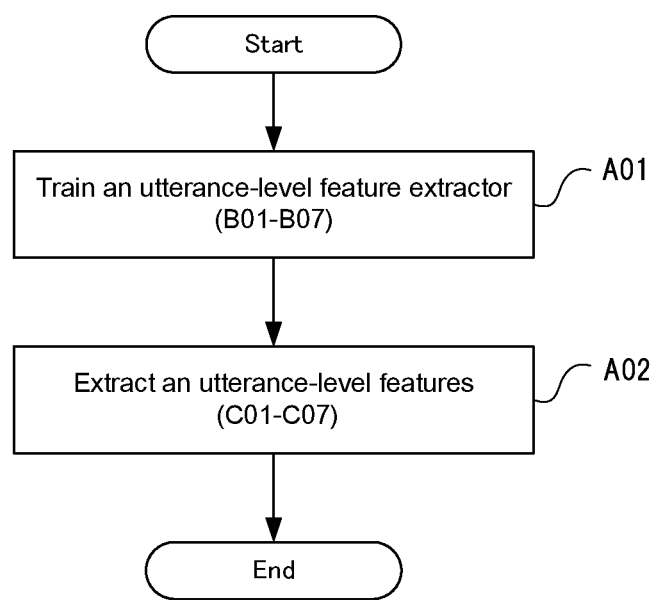
FIG. 6 is a flowchart showing operations performed by the speech feature extraction apparatus according to the first embodiment of the present invention.

First, as shown in FIG. 6, in the training part 100A, the utterance-level feature extraction unit 108 trains an utterance-level feature extractor and stores its parameters in storage 109 (step A01). In the case of NN-based speaker embedding, the NN parameters are stored. And in the case of i-vector, T matrix is stored.

Next, in the utterance-level feature extraction part 100B, the utterance-level feature extraction unit 112 uses the extractor parameters stored in storage 109, and extracts utterance-level features from the acoustic features from storage 110 together with their corresponding frame weights in storage 111 (step A02).

Figure 7:
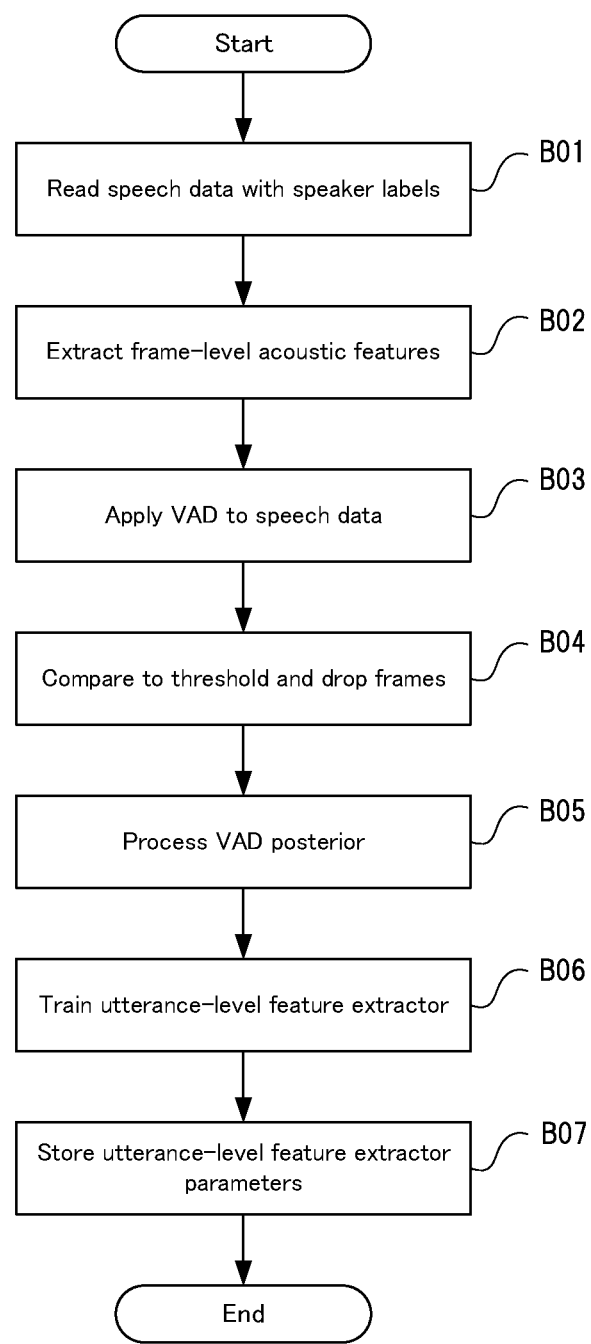
FIG. 7 is a flowchart showing specific operation of the training part according to the first embodiment.

FIG. 7 is a flowchart showing specific operation of the training part of the speech feature extractor according to the first embodiment. First, the acoustic feature extraction unit 102A reads speech data from storage 101 (step B01). Then, the acoustic feature extraction unit 102A extracts frame-level acoustic features (step B02).

Next, the VAD unit 103A applies a VAD and obtains posteriors for all frames (step B03). Next, the VAD unit 103A compares the posteriors with a pre-determined threshold and drops frames whose posteriors are smaller than the threshold (step B04).

Next, the VAD process unit 106A passes the VAD posteriors to a function F(P) and stores them as frame weights (step B05). Next, the utterance-level feature extractor training unit 108 trains an utterance-level feature extractor (step B06). Finally, the training unit 108 stores the extractor parameters in storage 109 (step B07).

Figure 8:
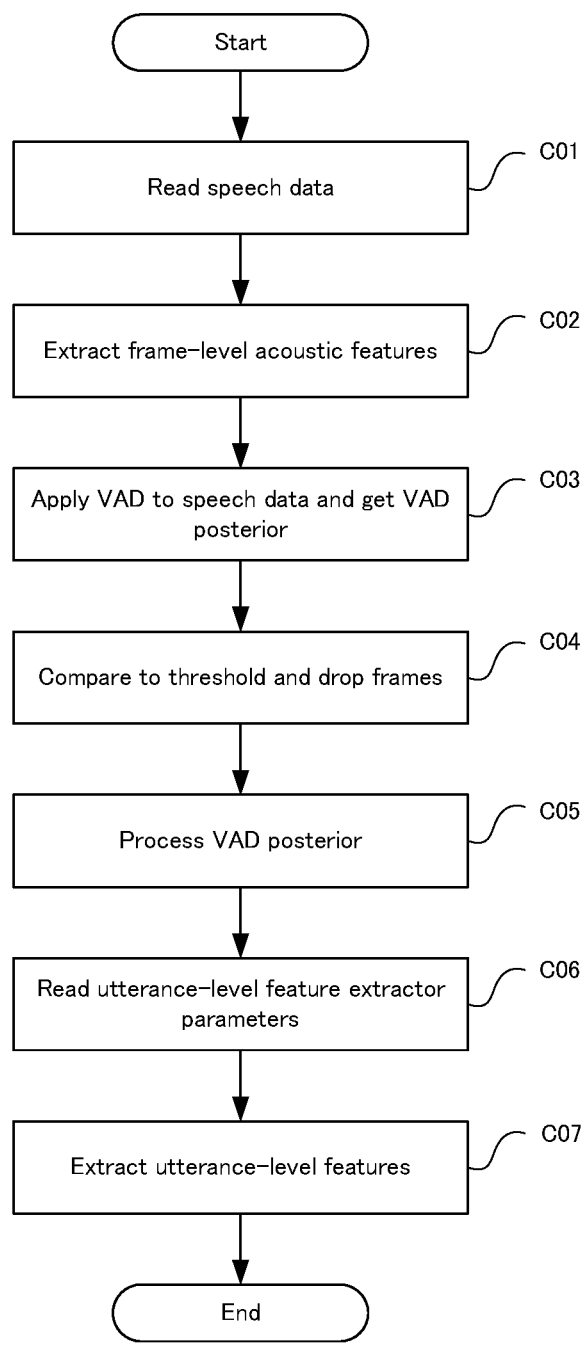
FIG. 8 is a flowchart showing specific operation of the speech feature extraction part according to the first embodiment.

FIG. 8 is a flowchart showing specific operation of the speech feature extraction part using the same VAD posteriors for dropping frames according to the first embodiment. First, the acoustic feature extraction unit 102B reads the input speech data (step C01). Then, the acoustic feature extraction unit 102B extracts frame-level acoustic features (step C02).

Next, the VAD unit 103B applies VAD and obtains posteriors for all frames (step C03). Next, the VAD unit 103B compares the posteriors with a pre-determined threshold and drops frames whose posteriors are smaller than the threshold (step C04).

Next, the VAD process unit 106B passes the VAD posteriors to a function F(P) and stores them as frame weights (step C05). Next, the utterance-level feature extraction unit 112 reads the utterance-level feature extractor parameter in storage 109 (step C06). Finally, the extraction unit 112 extracts utterance-level features (step C07).

Effect of First Exemplary Embodiment

The first embodiment can extract more appropriate utterance-level features using weighted pooling in a process converting frame level to utterance level. It uses a function of VAD posteriors as weights. The VAD posteriors are already commonly used in most speech processing systems including speaker recognition to drops frames which are likely to be non-voice. So, the first embodiment doesn't need extra information but can improve the features of utterances.

Program

A program of the first embodiment need only be a program for causing a computer to execute steps A01 to A02 shown in FIG. 6, steps B01 to B07 shown in FIG. 7, and steps C01 to C07 shown in FIG. 8. The speech feature extraction apparatus 100 and the speech feature extraction apparatus method according to the first embodiment can be realized by installing the program on a computer and executing it. In this case, the Processor of the computer functions as the training part 100A and the speech feature extraction part 100B, and performs processing.

The program according to the first embodiment may be executed by a computer system constructed using a plurality of computers. In this case, for example, each computer may function as a different one of the training part 100A and the speech feature extraction part 100B.

Second Embodiment

The first embodiment uses the same posteriors in weighted pooling and frame dropping. However, the VAD often used in frame dropping in speaker recognition is an energy-based method, which is a vulnerable to loud background noise or diverse noisy condition. So, the VAD posteriors are not accurate enough to be used for weighting frames in pooling. The second embodiment allows to use a different VAD to obtain posteriors for weighting frames in pooling, for example, NN-based VAD which is more accurate in various conditions.

Device Configuration

Figure 9:
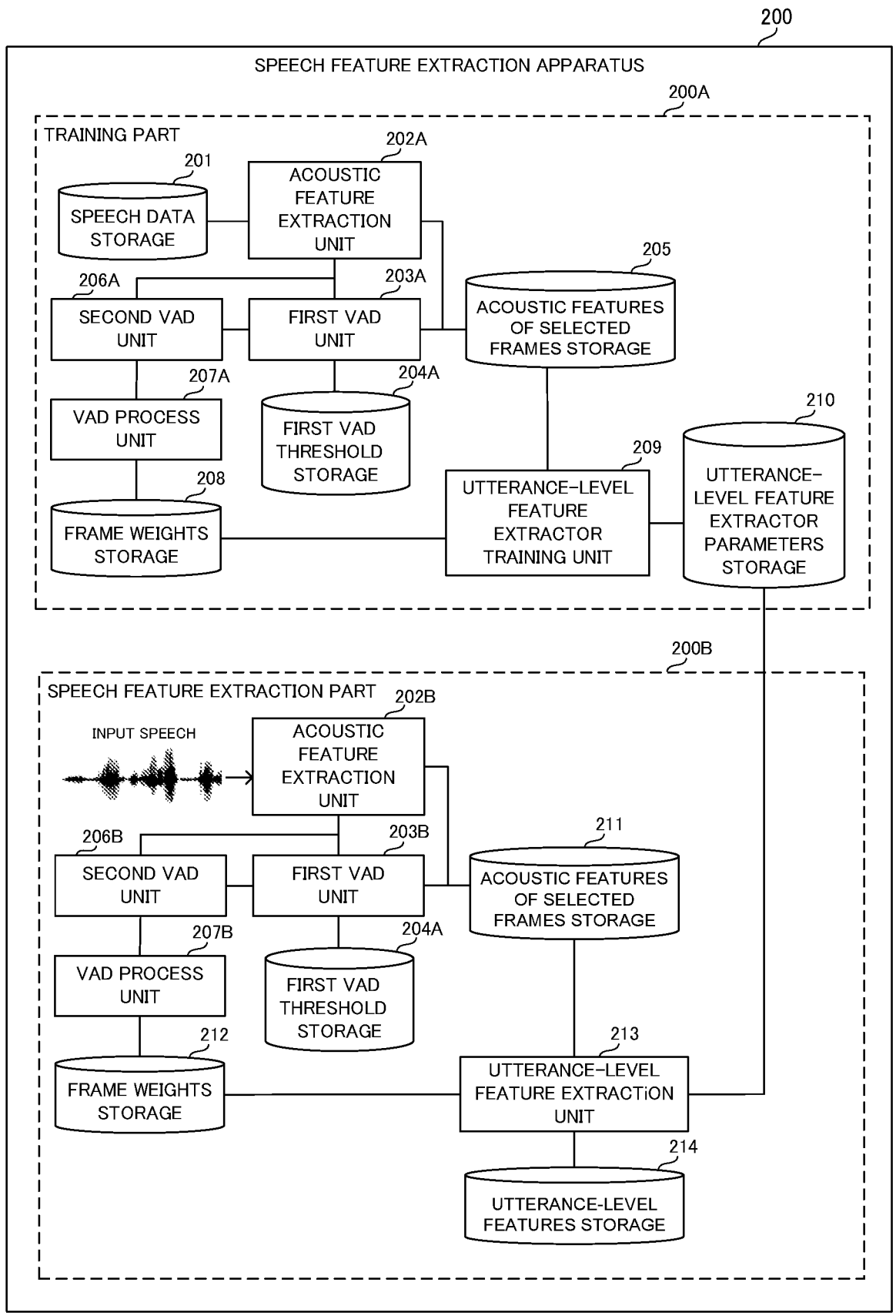
FIG. 9 is a block diagram showing the specific configuration of the speech feature extraction apparatus according to the second embodiment of the present invention.

First, a schematic configuration of a speech feature extraction apparatus 200 according to the second embodiment will be described using FIG. 9. FIG. 9 is a block diagram showing the specific configuration of the speech feature extraction apparatus according to the second embodiment of the present invention.

In the second embodiment of the present invention, a speech feature extraction apparatus using a new VAD will be described. The speech feature extraction apparatus 200 includes training part 200A and utterance-level feature extraction part 200B. But they are not necessarily to be tied together. The utterance-level feature extraction part can be used alone with the training part of the prior arts disclosed in the NPL1 and the NPL2.

As shown in FIG. 9, in the speech feature extraction apparatus 200 of the second embodiment, the training part 200A includes a speech data storage 201, a acoustic feature extraction unit 202A, a first VAD unit 203A, a first VAD threshold storage 204A, an acoustic feature of selected frames storage 205, a second VAD unit 206A, a VAD process unit 207A, a frame weighs storage 208, an utterance-level feature extractor training unit 209 and an utterance-level feature extractor parameter storage 210.

The speech feature extraction part 200B includes an acoustic feature extraction unit 202B, a first VAD unit 203B, a first VAD threshold storage 204B, an acoustic feature of selected frames storage 211, an second VAD unit 206B, a VAD process unit 207B, a frame weighs storage 212, an utterance-level feature extraction unit 213 and an utterance-level feature storage 214.

The acoustic feature extraction unit 202A and 202B have the same function. The first VAD unit 203A and 203B have the same function. The second VAD unit 206A and 206B have the same function. VAD process unit 207A and 207B have the same function. The VAD threshold storage 204A and 204B may be configured with the same storage, meaning that the same threshold is used in the training part and speech feature extraction part. Note that in case of VAD threshold storage, it is also possible to have different components in the training part and utterance-level feature extraction part.

In the training part 200A, the acoustic feature unit 201 extracts acoustic feature vectors f from data in speech data storage 201. The first VAD unit 203A applies the first VAD to the acoustic features and obtains a VAD posterior $P_1$ for each frame. Then, the first VAD unit 203A compares the posteriors $P_1$ with a pre-determined first VAD threshold THETA stored in the VAD threshold storage 204A, and drops those frames whose VAD posteriors are smaller than the threshold ($P_1$<THETA). The acoustic features of the remaining frames$\{f_i|P_i>=THETA\}$ are stored in the acoustic feature selected frames storage 205.

The second VAD unit 206A applies the second VAD to the acoustic features and obtains the second sets of VAD posteriors $P_2$. The VAD process unit 207A passes the second sets of VAD posteriors $P_2$ to a function and obtains weights for those frames $w=F(P_2)$ and stores them in the frame weights storage 208.

The utterance-level feature extractor training unit 209 reads the acoustic features of the selected frames from the acoustic feature of selected frames storage 205, and corresponding weights from the frame weights storage 208, then trains an utterance-level feature extractor, and finally stores the extractor parameters in the utterance-level feature extractor parameters storage 210.

In the speech feature extraction part 200B, the acoustic feature extraction unit 202B extracts acoustic feature vectors from the input speech data. The first VAD unit 203B applies the first VAD to the acoustic feature vectors and obtains a VAD posterior for each frame.

Comparing with the pre-determined VAD threshold stored in the first VAD threshold storage 204B, those frames whose VAD posteriors are smaller than the threshold are dropped and the acoustic features of the remaining frames are stored in the acoustic feature of selected frames storage 211.

The second VAD unit 206B applies the second VAD to the acoustic feature vectors and obtain another VAD posteriors for each frame. The VAD process unit 207B passes the second VAD posteriors to a function and obtain weights for the frame and stores them in the frame weights storage 212.

The utterance-level feature extraction unit 213 reads the acoustic features of the selected frames from selected acoustic feature storage 211, the corresponding weights from the frame weights storage 212, and extract parameters from the utterance-level feature extractor parameter storage 210. The utterance-level feature extraction unit 213 extracts one feature vector for the input utterance, and stores it in the utterance-level feature storage 214.

The second embodiment can also be applied to the case of NN-based speaker embedding and the case of i-vector as well in the same way as the first exemplary embodiment. (See the first embodiment).

The function in the VAD process unit 207A and 207B is monotonically increasing by the VAD posteriors, to make sure that more likely the frames is to be voice, more weights is given to it in pooling. In addition, it should also satisfy above Math. 3 over all frames selected for one utterance. (See first embodiment).

Operation of Apparatus

Next, the operation of performed by the speech feature extraction apparatus 200 according to the second embodiment of the present invention will be described with reference FIGS. 10 to 12. FIG. 9 will be referenced as necessary in the following description. Also, in the second embodiment, a speech feature extraction method is implemented by causing the speech feature extraction apparatus to operate. Accordingly, the following description of operations performed by the speech feature extraction apparatus 200 will substitute for a description of the speech feature extraction method of the second embodiment.

The whole operation of speech feature extraction 200 will be described by referring to FIG. 10. FIG. 10 is a flowchart showing operations performed by the speech feature extraction apparatus according to the second embodiment of the present invention. FIG. 10 contains operations of the training part 200A and the speech feature extraction part 200B. However, this shows an example, the operation of the training and feature extraction can be executed continuously or time interval can be inserted, or the operation of feature re extraction can be executed with other training operation, for example, prior art disclosed in the NPL1 and the NPL2.

Figure 10:
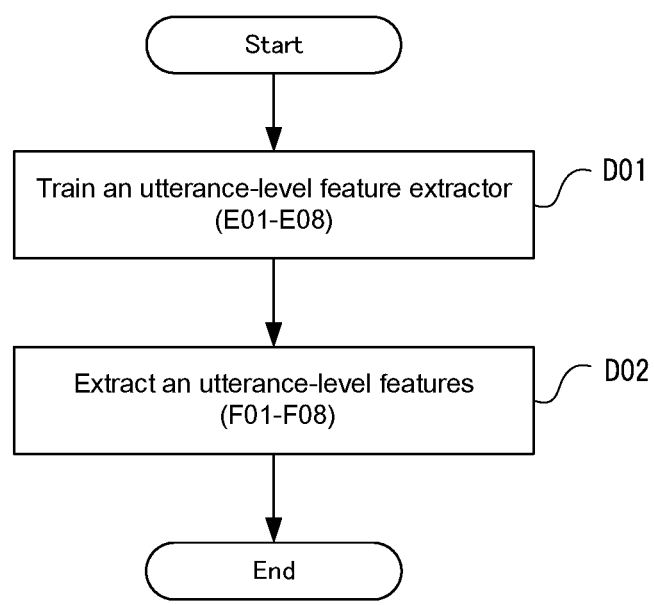
FIG. 10 is a flowchart showing operations performed by the speech feature extraction apparatus according to the second embodiment of the present invention.

First, as shown in FIG. 10, in the training part 200A, the utterance-level feature extractor training unit 209 trains an utterance-level feature extractor and stores its parameters in storage 210 (step D01). In the case of NN-based speaker embedding, the NN parameters are stored. And in the case of i-vector, T matrix is stored.

Next, in the utterance-level feature extraction part 200B, the utterance-level feature extraction unit 213 uses the extractor parameters stored in storage 210, and extracts utterance-level features from the acoustic features from storage 211 together with their corresponding frame weights in storage 212 (step B02).

Figure 11:
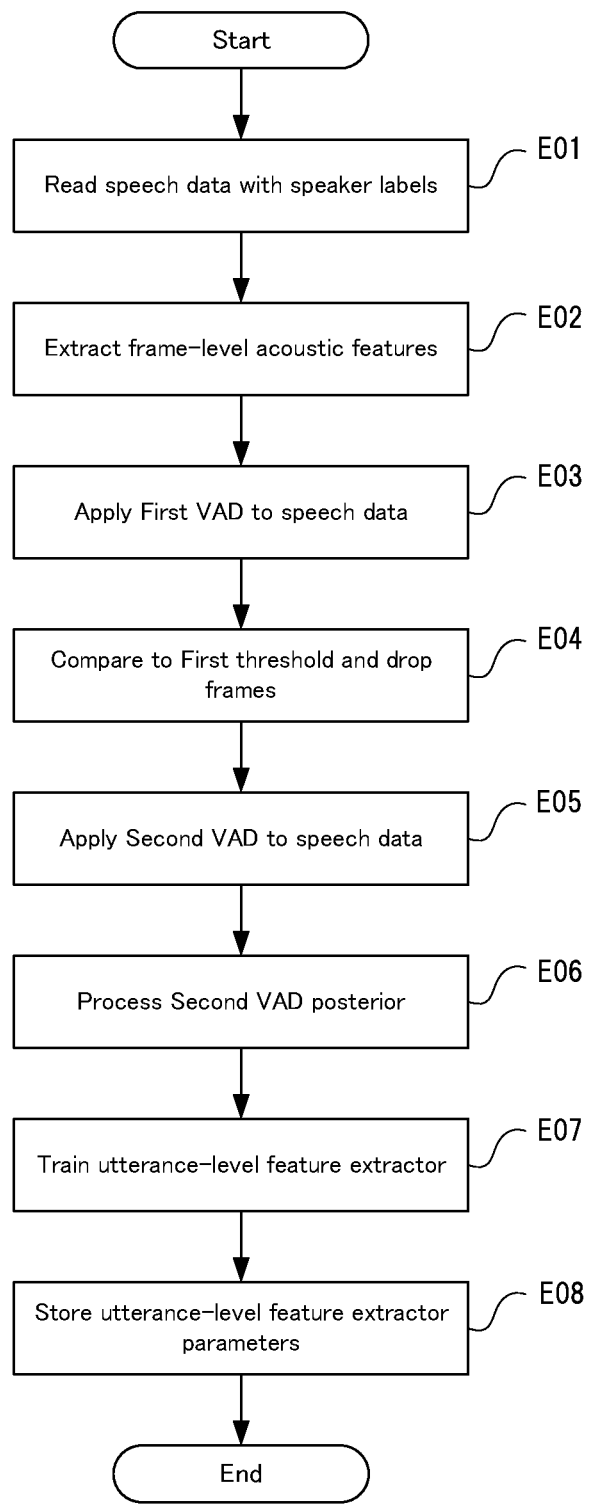
FIG. 11 is a flowchart showing specific operation of the training part according to the second embodiment.

FIG. 11 is a flowchart showing specific operation of the training part of the speech feature extractor using another VAD to obtain posteriors for weighted pooling, different from dropping frames, according to the second embodiment.

First, the acoustic feature extraction unit 202A reads speech data from storage 201 (step E01). Then, the acoustic feature extraction unit 202A extracts frame-level acoustic features (step E02).

Next, first VAD unit 203A applies the first VAD and obtains posteriors for all frames (step E03). Then, the first VAD unit 203A compares the posteriors with a pre-determined threshold and drops frames whose posteriors are smaller than the threshold (step E04).

Next, the second VAD unit 206A applies the second VAD and obtains the second set of posteriors for all frames (step E05). Then, the VAD process unit 207A passes the second set of VAD posteriors to a function $F(P_2)$ and stores them as frame weights (step E06).

Next, the utterance-level feature extractor training unit 209 trains the extractor (step E07). Finally, the training unit 209 stores the extractor parameters in storage 210 (step E08).

Figure 12:
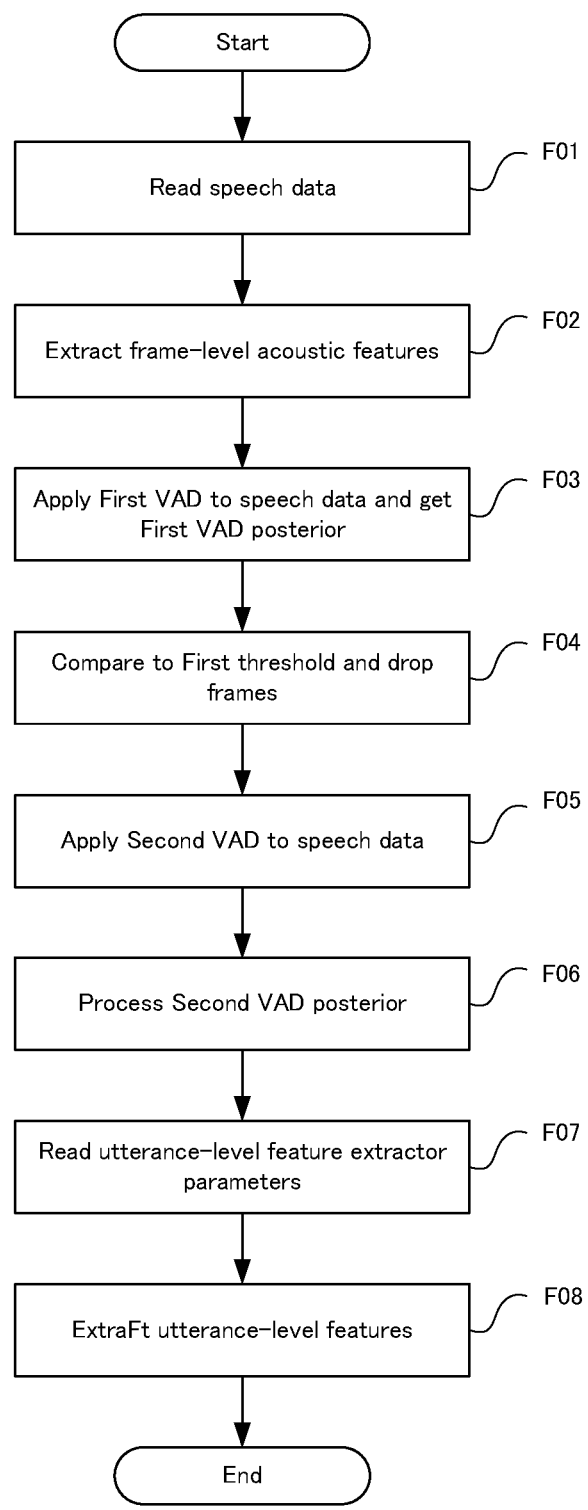
FIG. 12 is a flowchart showing specific operation of the speech feature extraction part according to the second embodiment.

FIG. 12 is a flowchart showing specific operation of the speech feature extraction part using another VAD to obtain posteriors for weighted pooling, different from dropping frames, according to the second embodiment.

First, the acoustic feature extraction unit 202B reads the input speech data (step F01). Then, the acoustic feature extraction unit 202B extracts frame-level acoustic features (step F02).

Next, the first VAD unit 203B applies the first VAD and obtains posteriors for all frames (step F03). Then, the VAD unit 203B compares the posteriors with a pre-determined threshold and drops frames whose posteriors are smaller than the threshold (step F04).

Next, the second VAD unit 206B applies the second VAD and obtains the second set of posteriors for all frames (step F05). Then, the VAD process unit 208B passes the second set of VAD posteriors to a function $F(P_2)$ and stores them as frame weights (step F06).

Next, the utterance-level feature extraction unit 213 reads the utterance-level feature extractor parameter in storage 210 (step F07). Finally, the extraction unit 213 extract utterance-level features (step F08).

Effect of Second Embodiment

The second embodiment can extract more appropriate utterance-level features using weighted pooling in a process converting frame-level to utterance-level. It uses a function of different VAD (generally with higher performance) posteriors as weights, from the VAD used in dropping frames. The VAD which produces posteriors for frame weights can have many choices, for example, NN-based VAD. Such VAD usually have more sophisticated structure than the VAD used in frame dropping. So, its posteriors are also more accurate to use for weights.

Program

A program of the second embodiment need only be a program for causing a computer to execute steps D01 to D02 shown in FIG. 10, steps E01 to E08 shown in FIG. 11, and steps F01 to F07 shown in FIG. 12. The speech feature extraction apparatus 200 and the speech feature extraction apparatus method according to the second embodiment can be realized by installing the program on a computer and executing it. In this case, the Processor of the computer functions as the training part 200A and the speech feature extraction part 200B, and performs processing.

The program according to the second embodiment may be executed by a computer system constructed using a plurality of computers. In this case, for example, each computer may function as a different one of the training part 200A and the speech feature extraction part 200B.

Third Embodiment

The second embodiment uses the posteriors from a more advanced VAD (second VAD) in weighted pooling, other than the VAD used in frame dropping (first VAD). However, sometimes different VAD have very different posteriors for the same frames, which means some non-voice frames may fool one of the VADs that take it as voice frames. Among those frames which are selected by first VAD may have very low posteriors in second VAD. Even though the second embodiment will give low weights for such frames, large amount of such frames still affect the final utterance-level feature. The third embodiment drops frames using both first VAD and second VAD, and then uses the advanced second VAD to give weights in pooling. It will remove the non-voice frames better, so that the final utterance-level features are more accurate.

Device Configuration

Figure 13:
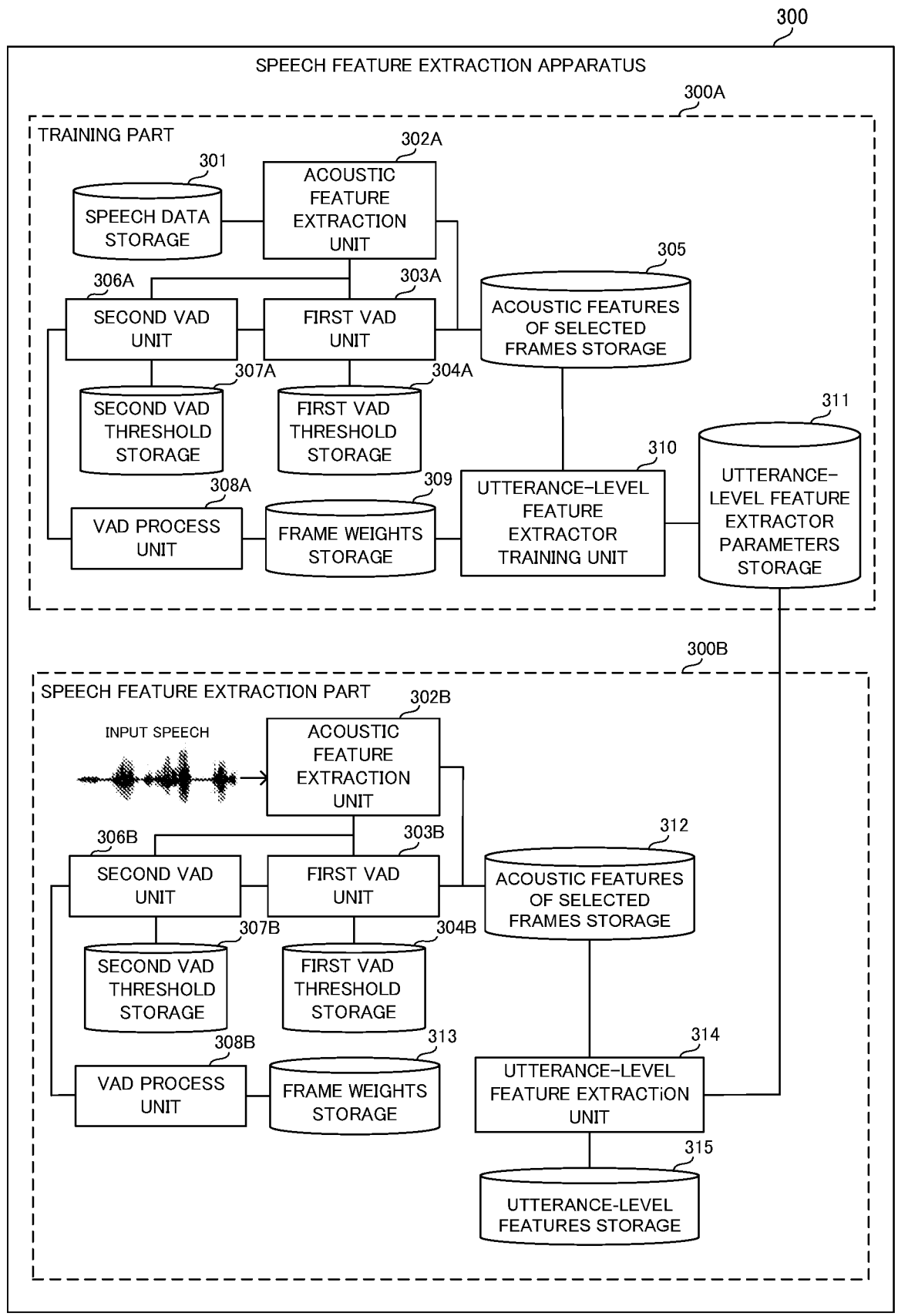
FIG. 13 is a block diagram showing the specific configuration of the speech feature extraction apparatus according to the third embodiment of the present invention.

First, a schematic configuration of a speech feature extraction apparatus 300 according to the third embodiment will be described using FIG. 13. FIG. 13 is a block diagram showing the specific configuration of the speech feature extraction apparatus according to the third embodiment of the present invention.

In the third embodiment of the present invention, a speech feature extraction apparatus using a new VAD for both weighted pooling and frame dropping will be described. The speech feature extraction apparatus 300 includes training part 300A and utterance-level feature extraction part 300B. But they are not necessarily to be tied together. The utterance-level feature extraction part can be used alone with the training part of the prior arts disclosed in the NPL1 and the NPL2.

As shown in FIG. 13, in the speech feature extraction apparatus 300, the training part 300A includes a speech data storage 301, an acoustic feature extraction unit 302A, a first VAD unit 303A, a first VAD threshold storage 304A, an acoustic feature of selected frames storage 305, a second VAD unit 306A, a second VAD threshold storage 307A, a VAD process unit 308A, a frame weighs storage 309, an utterance-level feature extractor training unit 310 and an utterance-level feature extractor parameter storage 311.

The speech feature extraction part 300B includes an acoustic feature extraction unit 302B, a first VAD unit 303B, a first VAD threshold storage 304B, an acoustic feature of selected frames storage 312, an second VAD unit 306B, an second VAD a threshold storage 307B, an VAD process unit 308B, a frame weighs storage 313, an utterance-level feature extraction unit 314 and an utterance-level feature storage 315.

The acoustic feature extraction unit 302A and 302B have the same function. The first VAD unit 303A and 303B have the same function. second VAD unit 306A and 306B have the same function. The VAD process unit 308A and 308B have the same function. The first VAD threshold storage 304A and 304B have the same storage, and the second VAD threshold storage 307A and 307B may be configured with the same storage, meaning that the same threshold is used in the training part and speech feature extraction part. Note that in case of VAD threshold storage, it is also possible to have different components in the training part and utterance-level feature extraction part.

In the training part 300A, the acoustic feature unit 302A extracts acoustic feature vectors f from data in the speech data storage 301. The first VAD unit 303A applies the first VAD to the acoustic features and obtains a VAD posterior $P_1$ for each frame. Then, the first VAD unit 303A compares the posteriors $P_1$ with a pre-determined first VAD threshold THETA' stored in the first VAD threshold storage 304A, and drops those frames whose VAD posteriors are smaller than the threshold ($P_1$<$THETA_1$).

The second VAD unit 306A applies the second VAD to the acoustic features and obtains the second sets of VAD posteriors $P_2$. The second VAD unit 306A compares the second sets of posteriors $P_2$. with a pre-determined second VAD threshold $THETA_2$ stored in second VAD threshold storage 307A, and further drops more frames whose second VAD posteriors $P_2$ are smaller than the threshold ($P_2$<$THETA_2$). The acoustic features of the remaining frames {$f_i$| ($P_{1i}$>=$THETA_1$) &&($P_{2i}$>=$THETA_2$)} are stored in selected acoustic feature storage 305.

The VAD posterior process unit 308A passes the second sets of VAD posteriors $P_2$ to a function and obtains weights for those frames w=F($P_2$) and stores them in the frame weights storage 309. The utterance-level feature extractor training unit 310 reads the acoustic features of the selected frames from selected acoustic feature storage 305, and corresponding weights from frame weights storage 309, then trains an utterance-level feature extractor, and finally stores the extractor parameters in the utterance-level feature extractor parameters storage 311.

It should be noted that the two posteriors $P_1$ and $P_2$ can be compared with a single threshold THETA by linear combining $P_1$ and $P_2$ in such a way as Math. 6.

$$\kappa P_1 + \lambda P_2 \gtreqless \theta. \quad [\text{Math. 6}]$$

In the speech feature extraction part 300B, the acoustic feature extraction unit 302B extracts acoustic feature vectors from the input speech data. first VAD unit 303B applies the first VAD to the acoustic feature vectors and obtains a VAD posterior for each frame. The second VAD unit 306B applies the second VAD to the acoustic feature vectors and obtains another VAD posteriors for each frame.

The first VAD unit 303B compares the first set of posteriors with a pre-determined first VAD threshold stored in first VAD threshold storage 304B, and drops those whose first VAD posteriors are smaller than the first threshold. The second VAD unit 306B compares the second set of posteriors of remaining frames, and further drops more frames whose second VAD posteriors are smaller than second VAD threshold.

The frames remained after two selections are stored in acoustic feature of selected frames storage 312. The VAD posterior process unit 308B passes the second VAD posteriors to a function and obtain weights for the frame and stores them in frame weights storage 313. The utterance-level feature extraction unit 314 reads the acoustic features of the selected frames from selected acoustic feature storage 312, the corresponding weights from frame weights storage 313, and extractor parameters from utterance-level feature extractor parameter storage 311. It extracts one feature vector for the input utterance, and stores it in utterance-level feature storage 315.

The third exemplary embodiment can also be applied to the case of NN-based speaker embedding and the case of i-vector as well in the same way as the first and the second exemplary embodiment (see first embodiment).

The function in VAD process unit 308A and 308B is monotonically increasing by the VAD posteriors, to make sure that more likely the frames is to be voice, more weights is given to it in pooling. In addition, it should also satisfy above Math. 3 over all frames selected for one utterance. (See first embodiment).

Operation of Apparatus

Next, the operation of performed by the speech feature extraction apparatus 300 according to the third embodiment of the present invention will be described with reference to FIGS. 14 to 16. FIG. 13 will be referenced as necessary in the following description. Also, in the third embodiment, a speech feature extraction method is implemented by causing the speech feature extraction apparatus to operate. Accordingly, the following description of operations performed by the speech feature extraction apparatus 300 will substitute for a description of the speech feature extraction method of the third embodiment.

The whole operation of speech feature extraction 300 will be described by referring to FIG. 14. FIG. 14 is a flowchart showing operations performed by the speech feature extraction apparatus according to the third embodiment of the present invention. FIG. 14 contains operations of the training part 300A and the speech feature extraction part 300B. However, this shows an example, the operation of the training and feature extraction can be executed continuously or time interval can be inserted, or the operation of feature re extraction can be executed with other training operation, for example, prior arts disclosed in the NPL1 and the NPL2.

Figure 14:
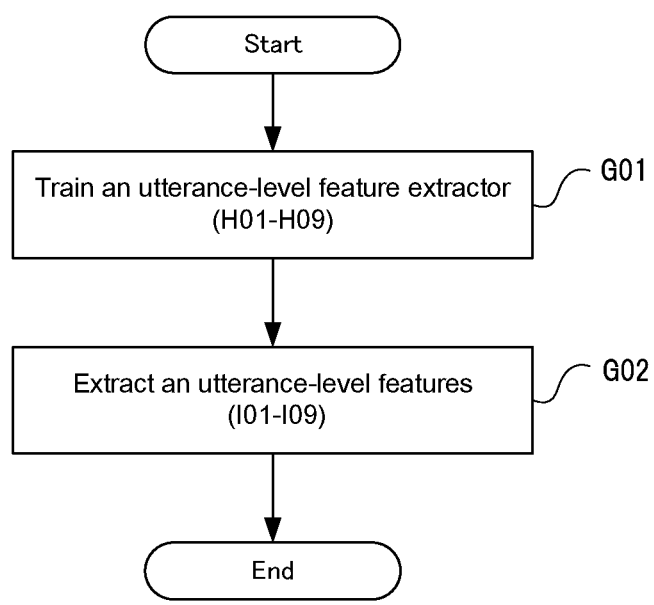
FIG. 14 is a flowchart showing operations performed by the speech feature extraction apparatus according to the third embodiment of the present invention.

First, as shown in FIG. 14, in the training part 300A, the utterance-level feature extractor training unit 310 trains an utterance-level feature extractor and stores its parameters in storage 311 (step G01). In the case of NN-based speaker embedding, the NN parameters are stored. And in the case of i-vector, T matrix is stored.

Next, in the utterance-level feature extraction part 300B, the utterance-level feature extraction unit 314 uses the extractor parameters stored in storage 311, and extracts utterance-level features from acoustic features from storage 312 together with their corresponding frame weights in storage 313 (step G02).

Figure 15:
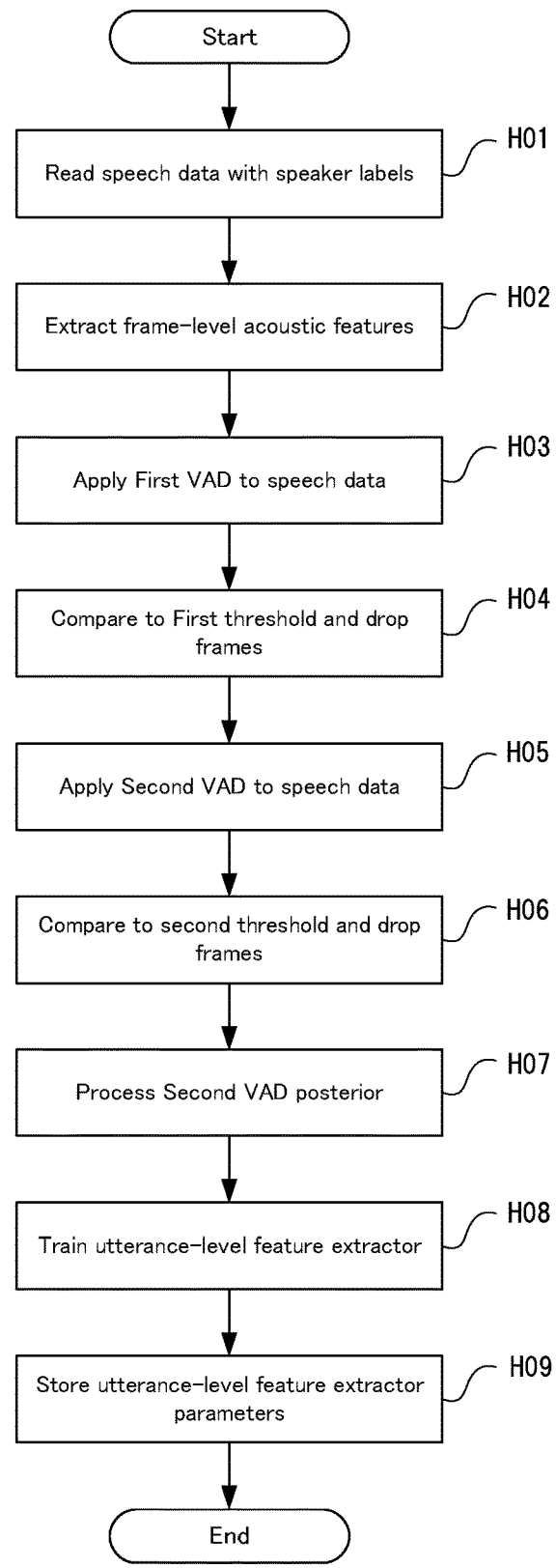
FIG. 15 is a flowchart showing specific operation of the training part according to the third embodiment.

FIG. 15 is a flowchart showing specific operation of the training part of the speech feature extractor using another VAD to obtain posteriors for weighted pooling, and also used in dropping frames in addition to a VAD originally used for dropping frames, according to the third embodiment.

First, the acoustic feature extraction unit 302A reads speech data from storage 301 (step H01). Then, the acoustic feature extraction unit 302A extracts frame-level acoustic features (step H02).

Next, the first VAD unit 303A applies the first VAD and obtains posteriors for all frames (step H03). Then, the first VAD unit 303A compares the posteriors with a pre-determined threshold and drops frames whose posteriors are smaller than the threshold (step H04).

Next, the second VAD unit 306A applies the second VAD and obtains the second set of posteriors for all frames (step H05). Then, the second VAD unit 306A compares the second set of posteriors with a pre-determined second threshold and further drops more frames whose posteriors are smaller than the second threshold (step H06).

Next, the VAD process unit 308A passes the second set of VAD posteriors to a function F($P_2$) and stores them as frame weights (step H07). Then, the utterance-level feature extractor training unit 310 trains the extractor (step H08). Finally, the training unit 310 stores the extractor parameters in storage 311 (step H09).

Figure 16:
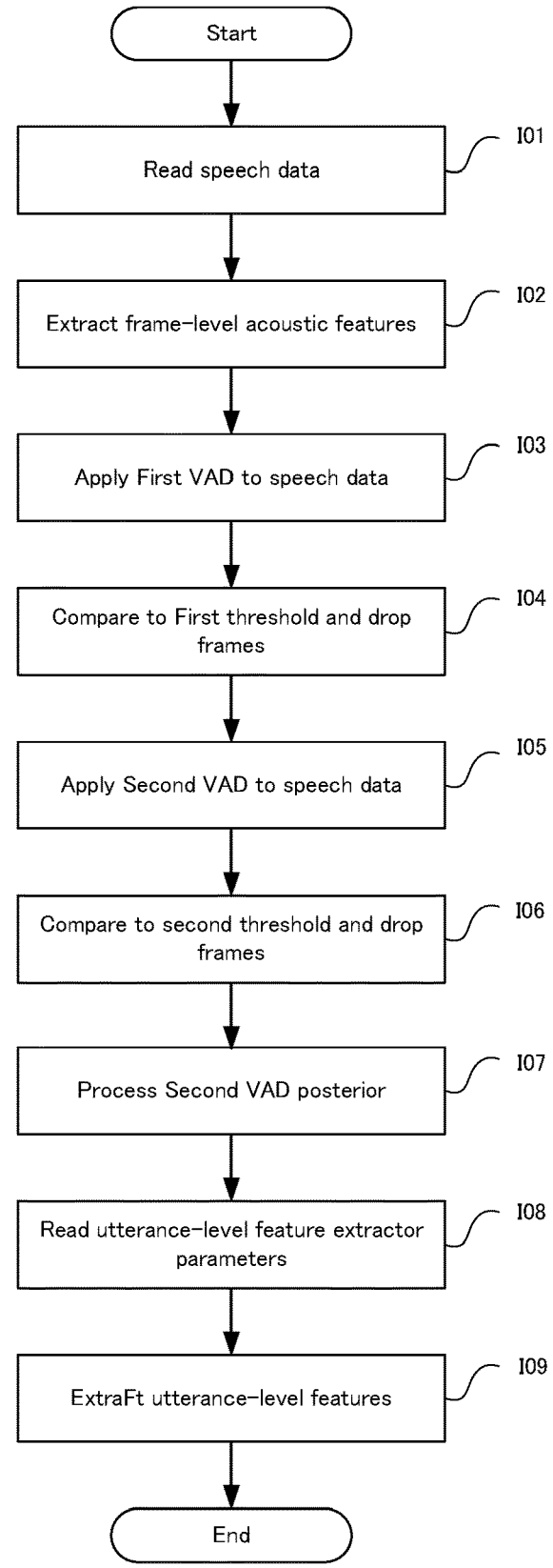
FIG. 16 is a flowchart showing specific operation of the speech feature extraction part according to the third embodiment.

FIG. 16 is a flowchart showing specific operation of the speech feature extraction part using another VAD to obtain posteriors for weighted pooling, and also used in dropping frames in addition to a VAD originally used for dropping frames, according to the third embodiment.

First, the acoustic feature extraction unit 302B reads the input speech data (step I01). Then, the acoustic feature extraction unit 302B extracts frame-level acoustic features (step I02).

Next, the first VAD unit 303B applies the first VAD and obtains posteriors for all frames (step I03). Then, the VAD unit 303B compares the posteriors with a pre-determined first threshold and drops frames whose posteriors are smaller than the threshold (step I04).

Next, the second VAD unit 306B applies the second VAD and obtains the second set of posteriors for all frames (step I05). Then, the second VAD unit 306A compares the second set of posteriors with a pre-determined second threshold and further drops more frames whose posteriors are smaller than the second threshold (step I06).

Next, the VAD process unit 308B passes the second set of VAD posteriors to a function $F(P_2)$ and stores them as frame weights (step I07). Then, the utterance-level feature extraction unit 314 reads the utterance-level feature extractor parameter in storage 312 (step I08). Finally, the extraction unit 314 extracts utterance-level features (step I09).

Effect of Third Embodiment

The third exemplary embodiment can extract more appropriate utterance-level features using weighted pooling in a process converting frame-level to utterance-level. It uses two VADs for dropping frames and uses a function of posteriors from the more advance one of the two VADs as weights.

The VAD which produces posteriors for frame weights, same as that in the second embodiment, can have many choices, for example, NN-based VAD. Such VAD usually have more sophisticated structure than the VAD used in frame dropping.

Two VADs are used for dropping frames to avoid some noisy frames fooling one VAD as voice. So, the final utterance-level feature is obtained by pooling the voiced frames with weights indicating the amount of voice posteriors, and it is more accurate.

Program

A program of the third embodiment need only be a program for causing a computer to execute steps G01 to G02 shown in FIG. 14, steps H01 to H09 shown in FIG. 15, and steps I01 to I09 shown in FIG. 16. The speech feature extraction apparatus 300 and the speech feature extraction apparatus method according to the second embodiment can be realized by installing the program on a computer and executing it. In this case, the Processor of the computer functions as the training part 300A and the speech feature extraction part 300B, and performs processing.

The program according to the third embodiment may be executed by a computer system constructed using a plurality of computers. In this case, for example, each computer may function as a different one of the training part 300A and the speech feature extraction part 300B.

Physical Configuration

Figure 17:
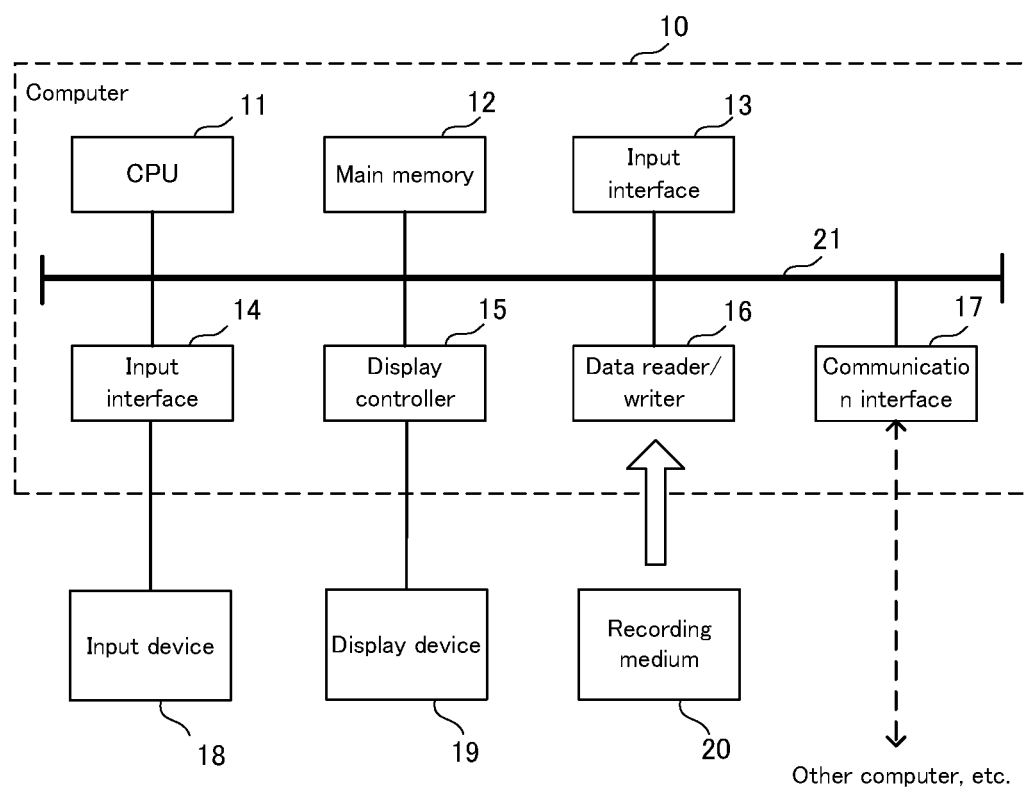
FIG. 17 is a block diagram showing an example of a computer that realizes the speech feature extraction apparatus according to the first to the third embodiment of the present invention.
Figure 18:
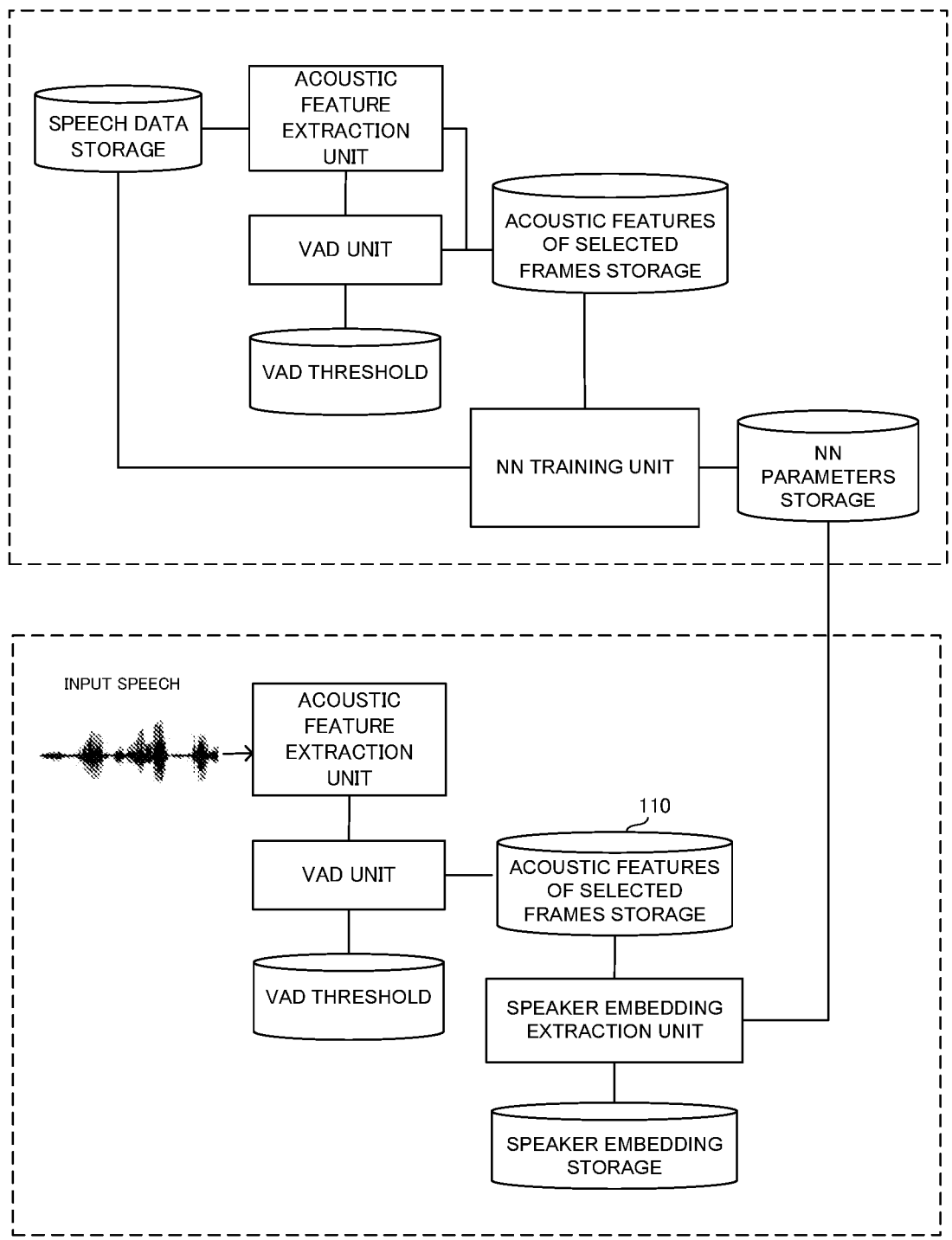
FIG. 18 is a block diagram of the speaker recognition system disclosed in NPL 2. Skilled artisans will appreciate that elements in the figures are illustrated for simplicity and clarity and have not necessarily been drawn to scale. For example, the dimensions of some of the elements in the figures illustrating integrated circuit architecture may be exaggerated relative to other elements to help to improve understanding of the present and alternate exemplary embodiments.

The following describes a computer that realizes the speech feature extraction apparatus by executing the program of the first, second or third embodiment, with reference to FIG. 17. FIG. 17 is a block diagram showing an example of a computer that realizes the speech feature extraction apparatus according to the first to the third embodiment of the present invention.

As shown in FIG. 17, the computer 10 includes a CPU (Central Processing Unit) 11, a main memory 12, a storage device 13, an input interface 14, a display controller 15, a data reader/writer 16, and a communication interface 17. These units are connected via a bus 21 so as to be capable of mutual data communication.

The CPU 11 carries out various calculations by expanding programs (codes) according to the present embodiment, which are stored in the storage device 13, to the main memory 12 and executing them in a predetermined sequence. The main memory 12 is typically a volatile storage device such as a DRAM (Dynamic Random-Access Memory). Also, the program according to the present embodiment is provided in a state of being stored in a computer-readable storage medium 20. Note that the program according to the present embodiment may be distributed over the Internet, which is connected to via the communication interface 17.

Also, specific examples of the storage device 13 include a semiconductor storage device such as a flash memory, in addition to a hard disk drive. The input interface 14 mediates data transmission between the CPU 11 and an input device 18 such as a keyboard or a mouse. The display controller 15 is connected to a display device 19 and controls display on the display device 18.

The data reader/writer 16 mediates data transmission between the CPU 11 and the storage medium 20, reads out programs from the storage medium 20, and writes results of processing performed by the computer 10 in the storage medium 20. The communication interface 17 mediates data transmission between the CPU 11 and another computer.

Also, specific examples of the storage medium 20 include a general-purpose semiconductor storage device such as CF (Compact Flash (registered trademark)) and SD (Secure Digital), a magnetic storage medium such as a flexible disk, and an optical storage medium such as a CD-ROM (Compact Disk Read Only Memory).

The pulse rate estimation apparatus 100 according to the present exemplary embodiment can also be realized using items of hardware corresponding to various components, rather than using the computer having the program installed therein. Furthermore, a part of the pulse rate estimation apparatus 100 may be realized by the program, and the remaining part of the pulse rate estimation apparatus 100 may be realized by hardware.

The above-described embodiment can be partially or entirely expressed by, but is not limited to, the following Supplementary Notes 1 to 24.

(Supplementary Note 1)

A speech feature extraction apparatus comprising:

a voice activity detection unit that drops non-voice frames from frames corresponding to an input speech utterance, and calculates a posterior of being voiced for each frame;

a voice activity detection process unit that calculates a function value as weights in pooling frames to produce an utterance-level feature, from a given a voice activity detection posterior;

an utterance-level feature extraction unit that extracts an utterance-level feature, from the frame on a basis of multiple frame-level features, using the function values.

(Supplementary Note 2)

The speech feature extraction apparatus according to supplementary note 1, further comprising a utterance-level feature extractor training unit that trains the utterance-level feature extraction unit to generate utterance-level feature extraction parameters using the multiple frame-level features and weights as the function values calculated by the voice activity detection process unit.

(Supplementary Note 3)

The speech feature extraction apparatus according to supplementary note 1, further comprising a second voice activity detection unit that drops non-voice frames and calculates a second posterior of being voiced for each frame, Wherein the utterance-level feature extraction unit utilizes weights from functions of the second posteriors while the posteriors are utilized for frame dropping.

(Supplementary Note 4)

The speech feature extraction apparatus according to supplementary note 2,

Wherein the utterance-level feature extractor training unit utilizes weights from functions of the second posteriors while the posteriors are used in frame dropping.

(Supplementary Note 5)

The speech feature extraction apparatus according to supplementary note 3,

Wherein the utterance-level feature extraction unit also utilizes a voice activity detection for obtaining weights for pooling to drop frames.

(Supplementary Note 6)

The speech feature extraction apparatus according to supplementary note 2,

Wherein utterance-level feature extractor training unit also utilizes a voice activity detection for obtaining weights for pooling to drop frames.

(Supplementary Note 7)

The speech feature extraction apparatus according to supplementary note 1,

Wherein the voice activity detection process unit employs a monotonically increasing and non-linear function defined as one of normalized Odds, and normalized log Odds, and the utterance-level feature extraction unit extracts an i-vector as a feature.

(Supplementary Note 8)

The speech feature extraction apparatus according to supplementary note 1,

Wherein the voice activity detection process unit employs a monotonically increasing function, and the utterance-level feature extraction unit extracts a feature using a neural network with at least one pooling layer.

(Supplementary Note 9)

A speech feature extraction method comprising:

(a) a step of dropping non-voice frames from frames corresponding to an input speech utterance, and calculates a posterior of being voiced for each frame;

(b) a step of calculating a function value as weights in pooling frames to produce an utterance-level feature, from a given a voice activity detection posterior;

(c) a step of extracting an utterance-level feature, from the frame on a basis of multiple frame-level features, using the function values.

(Supplementary Note 10)

The speech feature extraction method according to supplementary note 9, further comprising (d) a step of training the utterance-level feature extraction in the step (c) to generate utterance-level feature extraction parameters using the multiple frame-level features and weights as the function values calculated by the step (b).

(Supplementary Note 11)

The speech feature extraction method according to supplementary note 9, further comprising (e) a step of dropping non-voice frames and calculating a second posterior of being voiced for each frame, Wherein in the step (c), utilizing weights from functions of the second posteriors while the posteriors are utilized for frame dropping.

(Supplementary Note 12)

The speech feature extraction method according to supplementary note 10,

Wherein in the step (c), utilizing weights from functions of the second posteriors while the posteriors are used in frame dropping.

(Supplementary Note 13)

The speech feature extraction method according to supplementary note 11,

Wherein in the step (c), also utilizing a voice activity detection for obtaining weights for pooling to drop frames.

(Supplementary Note 14)

The speech feature extraction method according to supplementary note 10,

Wherein in the step (d), also utilizing a voice activity detection for obtaining weights for pooling to drop frames.

(Supplementary Note 15)

The speech feature extraction method according to supplementary note 9,

Wherein in the step (b), employing a monotonically increasing and non-linear function defined as one of normalized Odds, and normalized log Odds, and in the step (c), extracting an i-vector as a feature.

(Supplementary Note 16)

The speech feature extraction method according to supplementary note 9,

Wherein in the step (b), employing a monotonically increasing function, and in the step (c), extracting a feature using a neural network with at least one pooling layer.

(Supplementary Note 17)

A computer-readable storage medium storing a program that includes commands for causing a computer to execute:

(a) a step of dropping non-voice frames from frames corresponding to an input speech utterance, and calculates a posterior of being voiced for each frame;

(b) a step of calculating a function value as weights in pooling frames to produce an utterance-level feature, from a given a voice activity detection posterior;

(c) a step of extracting an utterance-level feature, from the frame on a basis of multiple frame-level features, using the function values.

(Supplementary Note 18)

The computer-readable storage medium according to supplementary note 17,

Wherein the program further includes commands causing the computer to execute (d) a step of training the utterance-level feature extraction in the step (c) to generate utterance-level feature extraction parameters using the multiple frame-level features and weights as the function values calculated by the step (b).

(Supplementary Note 19)

The computer-readable storage medium according to supplementary note 17,

Wherein the program further includes commands causing the computer to execute (e) a step of dropping non-voice frames and calculating a second posterior of being voiced for each frame, In the step (c), utilizing weights from functions of the second posteriors while the posteriors are utilized for frame dropping.

(Supplementary Note 20)

The computer-readable storage medium according to supplementary note 18,

Wherein in the step (c), utilizing weights from functions of the second posteriors while the posteriors are used in frame dropping.

(Supplementary Note 21)

The computer-readable storage medium according to supplementary note 19,

Wherein in the step (c), also utilizing a voice activity detection for obtaining weights for pooling to drop frames.

(Supplementary Note 22)

The computer-readable storage medium according to supplementary note 18,

Wherein in the step (d), also utilizing a voice activity detection for obtaining weights for pooling to drop frames.

(Supplementary Note 23)

The computer-readable storage medium according to supplementary note 17,

Wherein in the step (b), employing a monotonically increasing and non-linear function defined as one of normalized Odds, and normalized log Odds, and in the step (c), extracting an i-vector as a feature.

(Supplementary Note 24)

The computer-readable storage medium according to supplementary note 17,

Wherein in the step (b), employing a monotonically increasing function, and in the step (c), extracting a feature using a neural network with at least one pooling layer.

Although the invention of the present application has been described above with reference to the embodiment, the invention of the present application is not limited to the above embodiment. Various changes that can be understood by a person skilled in the art can be made to the configurations and details of the invention of the present application within the scope of the invention of the present application.

INDUSTRIAL APPLICABILITY

As described above, according to the present invention, it is possible to provide a more accurate representation of an utterance for speaker recognition task. The present invention is useful in fields, e.g. speaker verification.

REFERENCE SIGNS LIST

10 Computer
11 CPU
12 Main memory
13 Storage device
14 Input interface
15 Display controller
16 Data reader/writer
17 Communication interface
18 Input device
19 Display apparatus
20 Storage medium
21 Bus
100 Speech feature apparatus (first embodiment)
100A Training part
100B Utterance-level feature extraction part
101 Speech data storage
102A Acoustic feature extraction unit
102B Acoustic feature extraction unit
103 VAD unit
103A VAD unit
103B VAD unit
104A VAD threshold storage
104B VAD threshold storage
105 Selected acoustic features storage
106 VAD process unit
106A VAD process unit
106B VAD posterior unit
107 Frame weights storage
108 Utterance-level feature extractor training unit
109 Utterance-level feature extractor parameter storage
110 Acoustic features of selected frames storage
111 frame weights storage
112 Utterance-level feature extraction unit
113 Utterance-level features storage
200 Speech feature apparatus (second embodiment)
200A Training part
200B Utterance-level feature extraction part
201 Speech data storage
202A Acoustic feature extraction unit
202B Acoustic feature extraction unit
203A First VAD unit
203B First VAD unit
204A First VAD threshold storage
204B First VAD threshold storage
205 Acoustic feature of selected frames storage
206A Second VAD unit
206B Second VAD unit
207A VAD process unit
207B VAD posterior unit
208 Frame weights storage
209 Utterance-level feature extractor training unit
210 Utterance-level feature extractor parameter storage
211 Acoustic feature of selected frames storage
212 Frame weighs storage
213 Utterance-level feature extraction unit
214 Utterance-level feature storage
300 Speech feature apparatus (third embodiment)
300A Training part
300B Utterance-level feature extraction part
301 Speech data storage
302A Acoustic feature extraction unit
302B Acoustic feature extraction unit
303A First VAD unit
303B First VAD unit
304A First VAD threshold storage
304B First VAD threshold storage
305 Acoustic feature of selected frames storage
306A Second VAD unit
306B Second VAD unit
307A Second VAD threshold storage
308A VAD process unit
308B VAD posterior unit
309 Frame weights storage
310 Utterance-level feature extractor training unit
311 Utterance-level feature extractor parameter storage 312 Acoustic feature of selected frames storage
313 Frame weighs storage
314 Utterance-level feature extraction unit
315 Utterance-level feature storage

The invention claimed is:

1. A speech feature extraction apparatus comprising:
a processor; and
a memory device storing instructions executable by the processor to:
drop non-voice frames from frames corresponding to an input speech utterance, and calculate posterior of voice for the frames;
calculate function values from the posteriors; and
extract an utterance-level feature from the frames based on multiple frame-level features by using the function values as weights for pooling the frames in a pooling layer of a neural network.

2. The speech feature extraction apparatus according to claim 1, wherein the instructions are executable by the processor to further train extraction of the utterance-level feature to generate utterance-level feature extraction parameters using the multiple frame-level features and the weights.

3. The speech feature extraction apparatus according to claim 2,
wherein from function values of the second posteriors used as weights for dropping the non-voice frames are further used to train the extraction.

4. The speech feature extraction apparatus according to claim 2,
wherein voice activity detection used for obtaining weights for dropping the non-voice frames is further used to train the extraction.

5. The speech feature extraction apparatus according to claim 1, wherein the instructions are executable by the processor to further:
calculate second posteriors of voice for the frames; and
wherein function values of the second posteriors are used as weights for dropping the non-voice frames.

6. The speech feature extraction apparatus according to claim 5,
wherein voice activity detection is further used for obtaining the weights for dropping the non-voice frames.

7. The speech feature extraction apparatus according to claim 1,
wherein the a monotonically increasing and non-linear function defined as one of normalized Odds, and normalized log Odds, is used to calculate the function values from the posteriors, an i-vector is extracted as the utterance-level feature.

8. The speech feature extraction apparatus according to claim 1,
wherein the a monotonically increasing function is used to calculate the function values from the posteriors, and the utterance-level feature is extracted using the neural network.

9. A speech feature extraction method comprising:
dropping non-voice frames from frames corresponding to an input speech utterance, and calculating posteriors of voice for the frames;
calculating function values as weights from the posteriors;
extracting an utterance-level feature from the frames based on multiple frame-level features by using the function values as weights for pooling the frames in a pooling layer of a neural network.

10. A non-transitory computer-readable storage medium storing a program that includes commands for causing a computer to execute:
dropping non-voice frames from frames corresponding to an input speech utterance, and calculating posteriors of voice for the frames;
calculating function values as weights from the posteriors;
extracting an utterance-level feature from the frames based on multiple frame-level features by using the function values as weights for pooling the frames in a pooling layer of a neural network.

* * * * *